US010496316B1

(12) United States Patent
Proulx et al.

(10) Patent No.: US 10,496,316 B1
(45) Date of Patent: Dec. 3, 2019

(54) FORMING STORAGE CONTAINERS FROM EXTENTS HAVING DIFFERENT WIDTHS WITHIN A GROUP OF STORAGE DEVICES

(71) Applicant: EMC IP Holding Company LLC, Hopkinton, MA (US)

(72) Inventors: Ronald D. Proulx, Boxborough, MA (US); Shuyu Lee, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/176,651

(22) Filed: Oct. 31, 2018

(51) Int. Cl.
*G06F 3/06* (2006.01)

(52) U.S. Cl.
CPC .......... *G06F 3/0644* (2013.01); *G06F 3/0604* (2013.01); *G06F 3/0683* (2013.01); *G06F 3/0689* (2013.01)

(58) Field of Classification Search
CPC .............................. G06F 3/0683; G06F 3/0689
See application file for complete search history.

(56) References Cited

U.S. PATENT DOCUMENTS

| | | | | |
|---|---|---|---|---|
| 8,380,925 B2* | 2/2013 | Shimozono | ........... | G06F 3/0604 711/105 |
| 8,479,046 B1* | 7/2013 | Bailey | ................ | G06F 11/1088 714/2 |
| 8,706,960 B1* | 4/2014 | Ives | ...................... | G06F 3/0617 711/114 |
| 8,832,368 B1* | 9/2014 | Coatney | ................ | G06F 3/0689 711/114 |
| 8,972,778 B2* | 3/2015 | Kulkarni | ............ | G06F 11/2094 714/6.22 |
| 9,311,002 B1 | 4/2016 | Scott et al. | | |
| 9,330,105 B1 | 5/2016 | Duprey et al. | | |
| 9,383,940 B1 | 7/2016 | Ives et al. | | |
| 9,430,367 B1* | 8/2016 | Subramanian | .......... | G06F 12/02 |
| 9,641,615 B1* | 5/2017 | Robins | ............... | H04L 67/1097 |
| 9,703,664 B1 | 7/2017 | Alshawabkeh et al. | | |
| 9,842,028 B1* | 12/2017 | Mullis, II | ............ | G06F 11/1469 |
| 9,940,033 B1 | 4/2018 | Alshawabkeh et al. | | |
| 9,965,218 B1 | 5/2018 | Martin et al. | | |
| 10,025,523 B1 | 7/2018 | Dagan et al. | | |
| 10,073,621 B1 | 9/2018 | Foley et al. | | |
| 10,078,569 B1 | 9/2018 | Alshawabkeh et al. | | |
| 10,082,959 B1* | 9/2018 | Chen | ...................... | G06F 3/0608 |
| 10,089,026 B1* | 10/2018 | Puhov | ................... | G06F 3/0619 |

(Continued)

*Primary Examiner* — Khoa D Doan
(74) *Attorney, Agent, or Firm* — BainwoodHuang

(57) ABSTRACT

A technique forms storage containers within a group of storage devices. The technique involves partitioning each storage device of the group of storage devices into slices having a same storage size. The technique further involves creating, from the slices having the same storage size, first extents having a first extent width and second extents having a second extent width. The first extent width is different from the second extent width. The technique further involves provisioning (i) at least one first extent from the first extents having the first extent width to form a first storage container within the group of storage devices and (ii) at least one second extent from the second extents having the second extent width to form a second storage container within the group of storage devices. The first storage container and the second storage container share at least one storage device.

20 Claims, 9 Drawing Sheets

(56) References Cited

U.S. PATENT DOCUMENTS

| | | | |
|---|---|---|---|
| 10,095,425 B1 | 10/2018 | Martin | |
| 10,114,699 B2* | 10/2018 | Hung | G06F 11/1092 |
| 10,126,988 B1 | 11/2018 | Han et al. | |
| 2004/0073747 A1* | 4/2004 | Lu | G06F 3/0605 |
| | | | 711/114 |
| 2007/0106843 A1* | 5/2007 | Mori | G06F 1/3215 |
| | | | 711/114 |
| 2007/0118689 A1* | 5/2007 | Hyde, II | G06F 3/0607 |
| | | | 711/114 |
| 2007/0180190 A1* | 8/2007 | Li | G06F 3/0608 |
| | | | 711/114 |
| 2009/0037656 A1* | 2/2009 | Suetsugu | G06F 11/1092 |
| | | | 711/114 |
| 2009/0276566 A1* | 11/2009 | Coatney | G06F 3/0605 |
| | | | 711/114 |
| 2010/0031062 A1* | 2/2010 | Nishihara | G06F 21/80 |
| | | | 713/193 |
| 2010/0268875 A1* | 10/2010 | Sidnal | G06F 3/0604 |
| | | | 711/114 |
| 2011/0202723 A1* | 8/2011 | Yochai | G06F 3/0614 |
| | | | 711/114 |
| 2013/0067187 A1* | 3/2013 | Moss | G06F 3/0689 |
| | | | 711/170 |
| 2013/0132768 A1* | 5/2013 | Kulkarni | G06F 11/2094 |
| | | | 714/6.22 |
| 2014/0215107 A1* | 7/2014 | Morabad | G06F 13/00 |
| | | | 710/100 |
| 2017/0185331 A1* | 6/2017 | Gao | G06F 3/0619 |

* cited by examiner

FORMING STORAGE CONTAINERS FROM EXTENTS HAVING DIFFERENT WIDTHS WITHIN A GROUP OF STORAGE DEVICES

BACKGROUND

A data storage system includes storage devices for storing data. The storage devices may be configured to implement a particular RAID (redundant array of independent disks) level (e.g., RAID Level 5, RAID Level 6, etc.).

A particular data storage system may include different storage device groups that respectively implement different types of RAID protection. For example, the data storage system may include a first storage device group that performs RAID5 (4+1) using four data slices and one parity slice for each RAID extent, and a second storage device group that performs RAID5 (8+1) using eight data slices and one parity slice for each RAID extent.

SUMMARY

Unfortunately, there are deficiencies to the above described data storage system which includes different storage device groups that respectively implement different types of RAID protection. Along these lines, the data storage system is rigid in that two groups of storage devices are required to provide two different types of RAID protection (e.g., a first storage device group restricted to only providing RAID5 (4+1) protection and a second storage device group restricted to only providing RAID5 (8+1) protection).

Furthermore, with the advent of mapped RAID data storage systems, there are still restrictions on the locations of slices among storage devices. In particular, a storage container that includes multiple RAID extents on the same storage devices requires the slices belonging to the multiple RAID extents to be adjacent to each other (i.e., contiguous storage segments) thus leading to less flexibility and wasted storage device space (e.g., storage gaps or holes) when this adjacency requirement cannot be satisfied. Moreover, mapped RAID storage containers that contain RAID extents of different widths still cannot share the same set of storage devices.

In contrast to the above described data storage systems, improved techniques are directed to forming storage containers from extents having different widths where the extents having the different widths share the same group of storage devices. For example, on the same group of storage devices, a first storage container can be formed from four RAID5 (4+1) extents and a second storage container can be formed from two RAID5 (8+1) extents where each RAID extent includes slices having the same size. Moreover, due to how the various RAID extents are now specified (e.g., via listings of device identifier:slice offset pairs), there is no requirement that, when a storage container includes RAID extents on the same storage device, slices belonging to the RAID extents need to be adjacent to each other on the storage device. Such techniques not only provide improved space allocation flexibility but also enable greater storage efficiency.

One embodiment is directed to a method of forming storage containers within a group of storage devices. The method includes partitioning each storage device of the group of storage devices into slices having a same storage size. The method further includes creating, from the slices having the same storage size, first extents having a first extent width and second extents having a second extent width. The first extent width is different from the second extent width. The method further includes provisioning (i) at least one first extent from the first extents having the first extent width to form a first storage container within the group of storage devices and (ii) at least one second extent from the second extents having the second extent width to form a second storage container within the group of storage devices. The first storage container and the second storage container share at least one storage device of the group of storage devices.

In some arrangements, each first extent having the first extent width includes exactly a first number of slices, and each second extent having the second extent width includes exactly a second number of slices. The first number of slices is different from the second number of slices. Additionally, provisioning includes allocating a first number of first extents to form the first storage container and a second number of second extents to form the second storage container. The first number of first extents is different from the second number of second extents.

In some arrangements, creating the first extents having the first extent width and the second extents having the second extent width includes:
  (i) generating, as the first extents having the first extent width, first RAID (redundant array of independent devices) extents, each first RAID extent containing multiple data slices and at least one parity slice to provide a first ratio of data to parity, and
  (ii) generating, as the second extents having the second extent width, second RAID extents, each second RAID extent containing multiple data slices and at least one parity slice to provide a second ratio of data to parity.
The first ratio of data to parity is different from the second ratio of data to parity.

In some arrangements, allocating the first number of first extents to form the first storage container and the second number of second extents to form the second storage container includes provisioning each of the first storage container and the second storage container with a same total number of data slices. Such arrangements configure each of the first storage container and the second storage container to hold a same amount of data.

In some arrangements, partitioning each storage device of the group of storage devices into slices having the same storage size includes dividing storage space provided by each storage device of the group of storage devices into 4-GB (gigabyte) portions to form the slices having the same storage size.

In some arrangements, provisioning each of the first storage container and the second storage container with the same total number of data slices includes provisioning the first storage container with a first 4-GB portion from a particular storage device and the second storage container with a second 4-GB portion from the particular storage device. That is, the storage containers share the same storage device because each storage container has at least one 4-GB slice on that storage device.

In some arrangements, provisioning each of the first storage container and the second storage container with the same total number of data slices includes provisioning each of the first storage container and the second storage container with 16 4-GB portions for holding data. Accordingly, each of the first storage container and the second storage container is configured to hold 64 GB of data.

In some arrangements, each first RAID extent includes exactly four data slices and exactly one parity slice, and each second RAID extent includes exactly eight data slices and exactly one parity slice. Additionally, provisioning each of the first storage container and the second storage container with 16 4-GB portions includes providing the first storage container with exactly four first RAID extents, and providing the second storage container with exactly two second RAID extents.

In some arrangements, each first RAID extent includes exactly eight data slices and exactly one parity slice, each second RAID extent includes exactly 16 data slices and exactly one parity slice. Additionally, provisioning each of the first storage container and the second storage container with 16 4-GB portions includes providing the first storage container with exactly two first RAID extents, and providing the second storage container with exactly one second RAID extent.

In some arrangements, each first RAID extent includes exactly four data slices and exactly one parity slice, and each second RAID extent includes exactly 16 data slices and exactly one parity slice. Additionally, provisioning each of the first storage container and the second storage container with 16 4-GB portions includes providing the first storage container with exactly four first RAID extents, and providing the second storage container with exactly one second RAID extent.

In some arrangements, the method further includes, in response to a first storage request to store first host data on behalf of a set of host computers, (i) generating first parity from a portion of the first host data and (ii) storing the portion of the first host data and the first parity in a first RAID extent. The method further includes, in response to a second storage request to store second host data on behalf of the set of host computers, (i) generating second parity from a portion of the second host data and (ii) storing the portion of the second host data and the second parity in a second RAID extent.

In some arrangements, the first RAID extent and the second RAID extent share a particular storage device of the group of storage devices. The method further includes sustaining a failure of the particular storage device that loses a part of the first RAID extent and a part of the second RAID extent, and performing a RAID recovery operation. The RAID recovery operation reconstructs the part of the first RAID extent from remaining parts of the first RAID extent and reconstructs the part of the second RAID extent from remaining parts of the second RAID extent.

In some arrangements, generating the first RAID extents includes preventing each first RAID extent from having more than one slice from the same storage device. Additionally, generating the second RAID extents includes preventing each second RAID extent from having more than one slice from the same storage device.

In some arrangements, the first RAID extents are RAID5 (4+1) extents, each RAID5 (4+1) extent having exactly four data slices and exactly one parity slice. Additionally, the second RAID extents are RAID5 (8+1) extents, each RAID5 (8+1) extent having exactly eight data slices and exactly one parity slice. The method further includes generating third RAID extents, each third RAID extent containing exactly 16 data slices and exactly one parity slice, and allocating exactly one third RAID extent from the third RAID extents to form a third storage container that shares at least one storage device of the group of storage devices with the first storage container and the second storage container.

In some arrangements, multiple first extents having the first extent width are created from a subgroup of storage devices of the group of storage devices. Additionally, provisioning includes combining only first extents created from the subgroup of storage devices to form the first storage container.

In some arrangements, combining only the first extents created from the subgroup of storage devices to form the first storage container includes selecting a particular first extent and another first extent for use as at least part of the first storage container. The particular first extent has a first slice on a particular storage device of the subgroup of storage devices and the other first extent has a second slice on the particular storage device of the subgroup of storage devices. The first slice on the particular storage device and the second slice on the particular storage device are separated from each other by at least one slice on the particular storage device that does not belong to the first storage container.

In some arrangements, the particular first extent has a first slice on another storage device of the subgroup of storage devices and the other first extent has a second slice on the other storage device of the subgroup of storage devices. Additionally, the first slice on the other storage device and the second slice on the other storage device are adjacent to each other on the other storage device.

Another embodiment is directed to data storage equipment that includes a storage interface constructed and arranged to communicate with a group of storage devices, memory, and control circuitry coupled with the storage interface and the memory. The memory stores instructions which, when carried out by the control circuitry, cause the control circuitry to:
  (A) partition each storage device of the group of storage devices into slices having a same storage size,
  (B) from the slices having the same storage size, create first extents having a first extent width and second extents having a second extent width, the first extent width being different from the second extent width, and
  (C) provision (i) at least one first extent from the first extents having the first extent width to form a first storage container within the group of storage devices and (ii) at least one second extent from the second extents having the second extent width to form a second storage container within the group of storage devices, the first storage container and the second storage container sharing at least one storage device of the group of storage devices.

The data storage equipment is constructed and arranged to store host data within the first storage container and the second storage container on behalf of a set of host computers.

Yet another embodiment is directed to a computer program product having a non-transitory computer readable medium which stores a set of instructions to form storage containers within the group of storage devices. The set of instructions, when carried out by computerized circuitry, causing the computerized circuitry to perform a method of:
  (A) partitioning each storage device of the group of storage devices into slices having a same storage size;
  (B) from the slices having the same storage size, creating first extents having a first extent width and second extents having a second extent width, the first extent width being different from the second extent width; and
  (C) provisioning (i) at least one first extent from the first extents having the first extent width to form a first storage container within the group of storage devices and (ii) at least one second extent from the second extents having the second extent width to form a second storage container within the group of storage devices.

The first storage container includes a slice on a particular storage device of the group of storage devices and the second storage container includes another slice on the particular storage device of the group of storage devices.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in forming storage containers within a group of storage devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to forming storage containers from extents having different widths within the same group of storage devices. For example, on the same group of storage devices, a first storage container can be formed from four RAID5 (4+1) extents and a second storage container can be formed from two RAID5 (8+1) extents where each extent includes storage slices having the same size. Furthermore, there is no requirement that, when a storage container includes multiple extents on the same storage device, that slices belonging to the extents need to be adjacent to each other on that storage device. Such techniques not only provide improved space allocation flexibility, but also enable increased storage efficiency.

Figure 1:
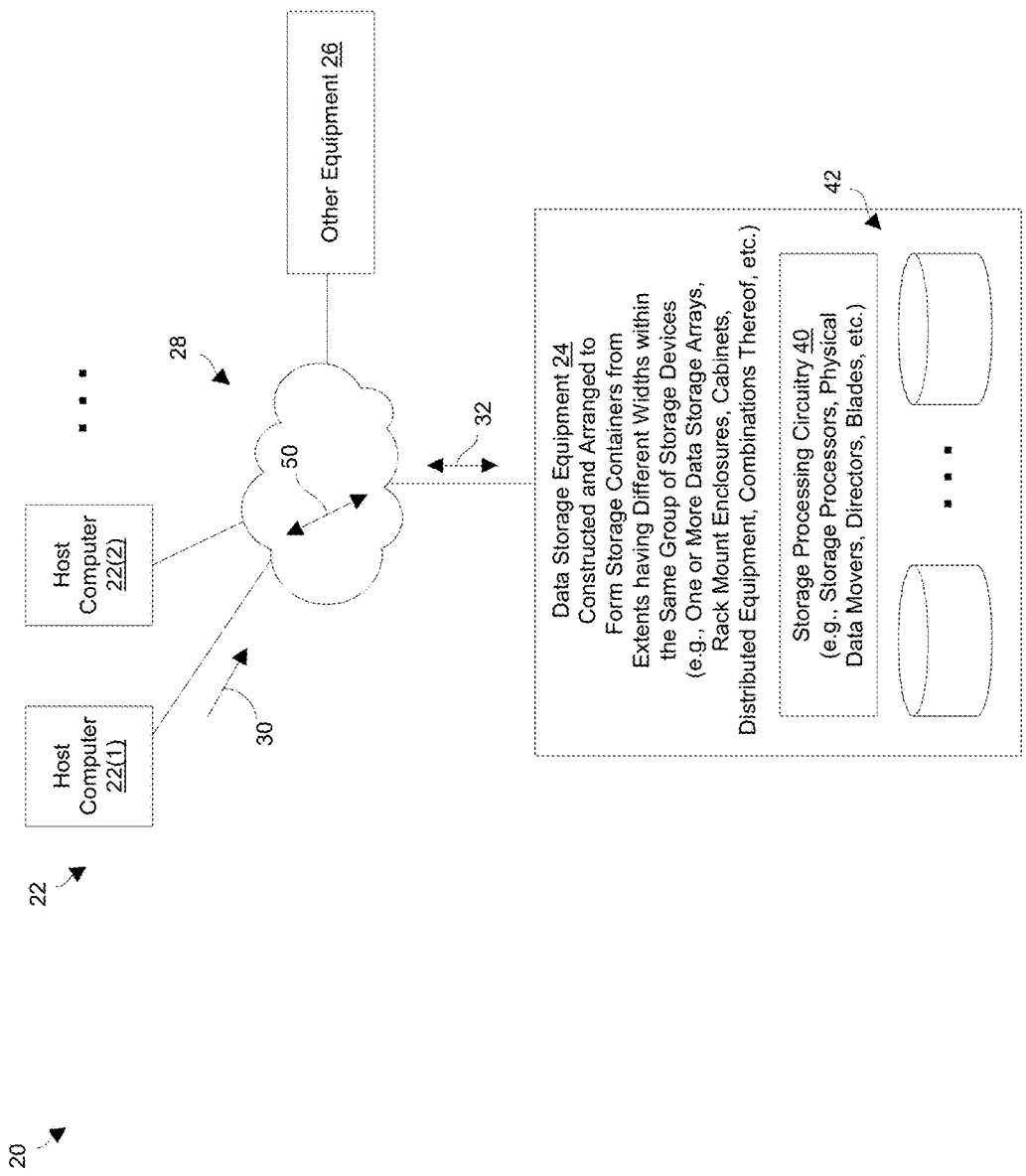
FIG. 1 is a block diagram of a data storage environment which forms storage containers from extents having different widths where the extents having the different widths share the same group of storage devices in accordance with certain embodiments.

FIG. 1 shows a data storage environment 20 which forms storage containers from extents having different widths within the same group of storage devices. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. In this context, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage containers (e.g., a file, a file system, a logical unit of storage or LUN, a volume, a virtual volume or VVol, etc.).

The data storage equipment 24 includes storage processing circuitry 40 and storage devices 42. The storage processing circuitry 40 is constructed and arranged to respond to the host I/O requests 30 from the host computers 22 by writing host data 32 into the storage devices 42 and reading host data 32 from the storage devices 42 (e.g., solid state drives, magnetic disk drives, combinations thereof, etc.). The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 is constructed and arranged to provide a variety of specialized data storage system services such as caching, tiering, deduplication, compression, encryption, mirroring, providing RAID (redundant array of independent disks) protection, snapshotting, backup/archival services, replication, and so on.

The storage devices 42 may be co-located with the storage processing circuitry 40. Alternatively, the storage devices 42 reside in a separate location (e.g., a separate storage device assembly/array).

Additionally, the data storage equipment 24 may take a variety of topologies. In some arrangements, all of the data storage equipment 24 resides in a single location (e.g., a single cabinet, lab, room, floor, building, campus, etc.). In other arrangements, the data storage equipment 24 includes components that are distributed among multiple locations (e.g., different corners of a room, floors, buildings, campuses, towns, states, coasts, countries, etc.).

Furthermore, the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., file-based operations, block-based operations, combinations thereof, etc.

The other equipment 26 refers to other componentry of the data storage environment 20 that may be accessed by the host computers 22 and/or the data storage equipment 24, or other componentry that may be able to access the host computers 22 and/or the data storage equipment 24. For example, the other equipment 26 may include one or more user devices (e.g., a desktop, a laptop, a tablet, a smartphone, a terminal, etc.) which are able to access a host computer 22. As another example, the other equipment 26 may include a storage administrative device (e.g., a service processor) which is able to access the data storage equipment 24, and so on.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 to the data storage equipment 24 for processing. In response, the storage processing circuitry 40 of the data storage equipment 24 robustly and reliably performs host I/O operations such as writing host data 32 into and reading host data 32 from the storage devices 42 using mapped RAID.

To this end, the storage processing circuitry 40 of the data storage equipment 24 stores the host data 32 in storage containers that are formed from extents having different widths within the same group of storage devices 42. Even though the storage containers include extents having different widths, such storage containers may be configured to hold the same amount of host data 32 (e.g., 64 GB storage containers) and may include storage slices that are the same size (e.g., 4 GB slices). Each storage slice is contiguous memory (usually on an addressable boundary) for holding data.

Such operation provides increased storage efficiency with mapped RAID. Particular examples of how these storage containers are formed and managed will be provided shortly in connection with FIGS. 3 through 8. Further details will now be provided with reference to FIG. 2.

Figure 2:
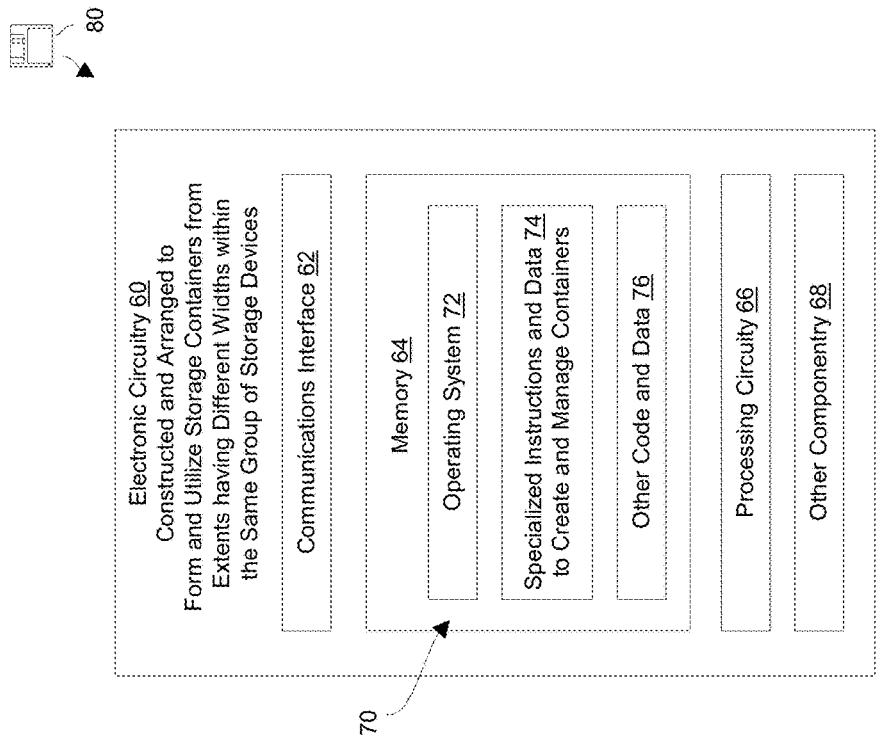
FIG. 2 is a block diagram of electronic circuitry which is suitable for use within the data storage environment of FIG. 1 in accordance with certain embodiments.

FIG. 2 shows an electronic circuitry 60 which is suitable for use within the data storage environment 20 (also see FIG. 1) in accordance with certain embodiments. Along these lines, the electronic circuitry 60 may form a part of the storage processing circuitry 40 or reside as separate circuitry within the data storage equipment 24. The electronic circuitry 60 includes a communications interface 62, memory 64, and processing circuitry 66, and other componentry 68.

The communications interface 62 is constructed and arranged to connect the electronic circuitry 60 to the communications medium 28 (also see FIG. 1) to enable communications with other devices of the data storage environment 20 (e.g., the host computers 22, the other equipment 26, etc.). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 refers to code that enables electronic circuitry 60 to form and manage containers from extents having different widths within the same group of storage devices 42. In some arrangements, the specialized instructions and data 74 is tightly integrated with or part of the operating system 72 itself. The other code and data 76 refers to applications and routines to provide additional operations and services (e.g., performance measurement tools, etc.), user-level applications, administrative tools, utilities, and so on.

The processing circuitry 66 is constructed and arranged to operate in accordance with the various software constructs 70 stored in the memory 64. As will be explained in further detail shortly, the processing circuitry 66 executes the specialized instructions and data 74 to form specialized control circuitry that creates storage containers from extents having different widths within the same group of storage devices 42, and utilizes the storage containers (e.g., stores data within the storage containers, reconstructs data after a storage device failure, and so on).

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The other componentry 68 refers to other hardware of the electronic circuitry 60. Along these lines, the electronic circuitry 60 may include storage device adaptors, a user interface, other specialized data storage hardware, etc. Further details will now be provided with reference to FIGS. 3 through 5.

Figure 3:
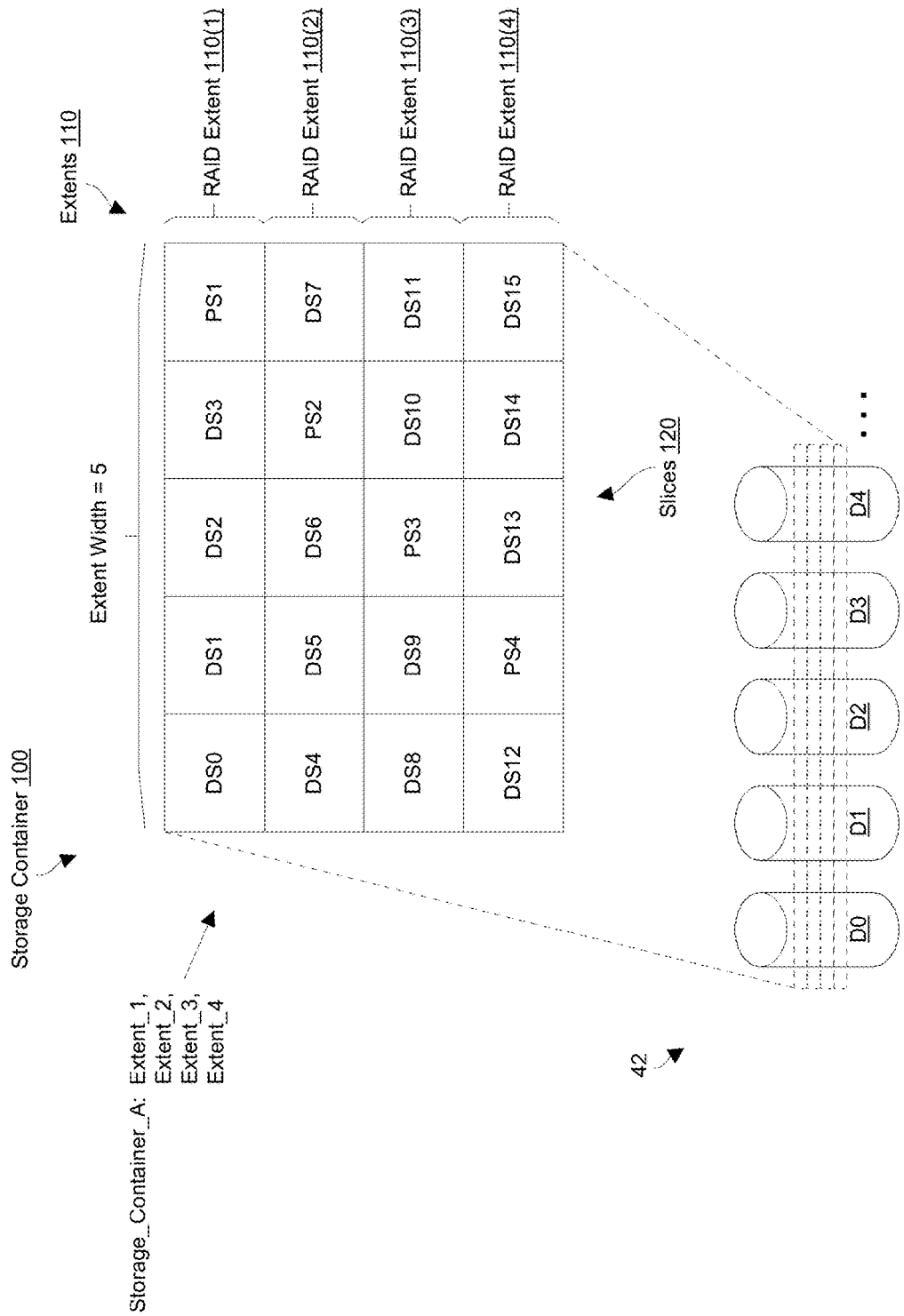
FIG. 3 is a block diagram illustrating particular details of a first example storage container in accordance with certain embodiments.
Figure 4:
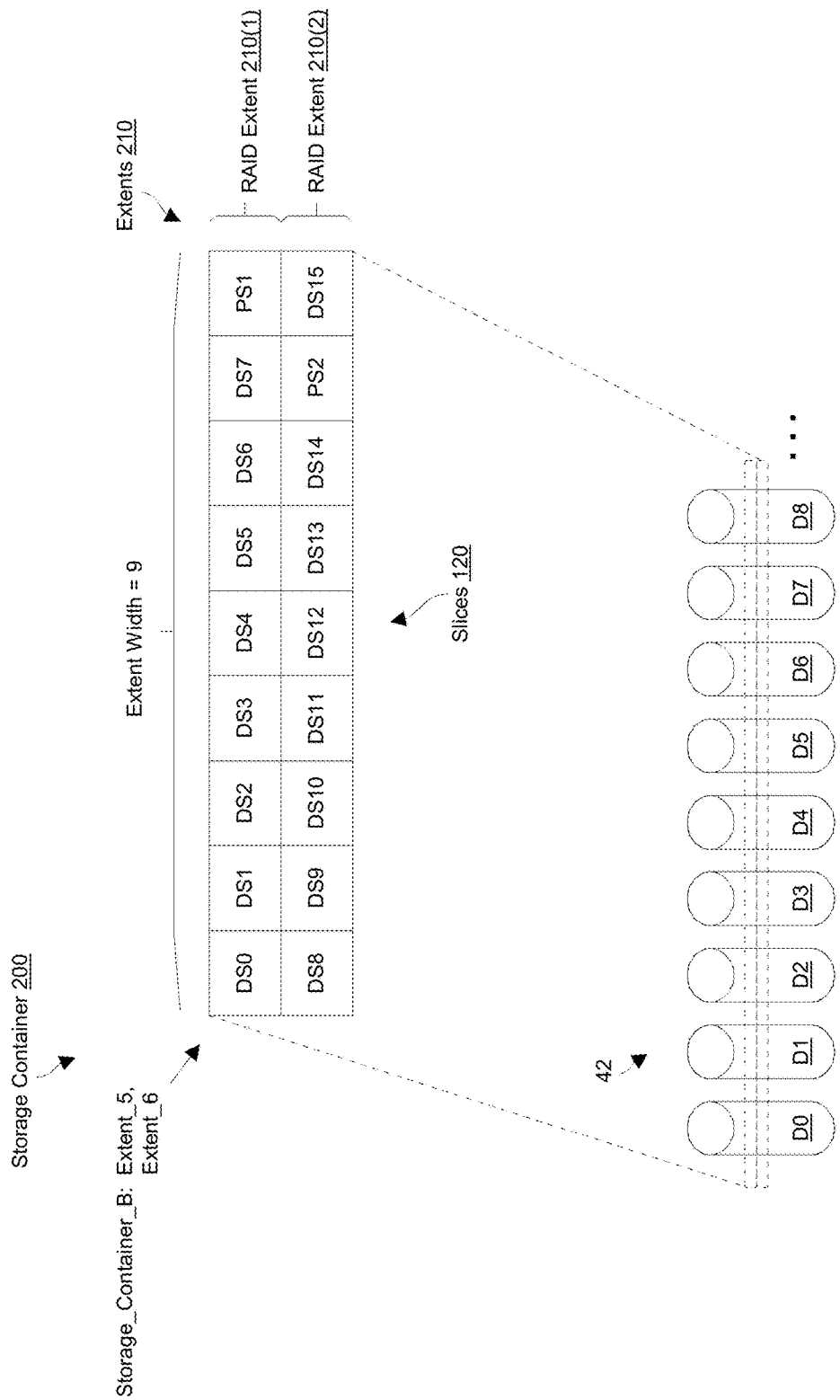
FIG. 4 is a block diagram illustrating particular details of a second example storage container in accordance with certain embodiments.
Figure 5:
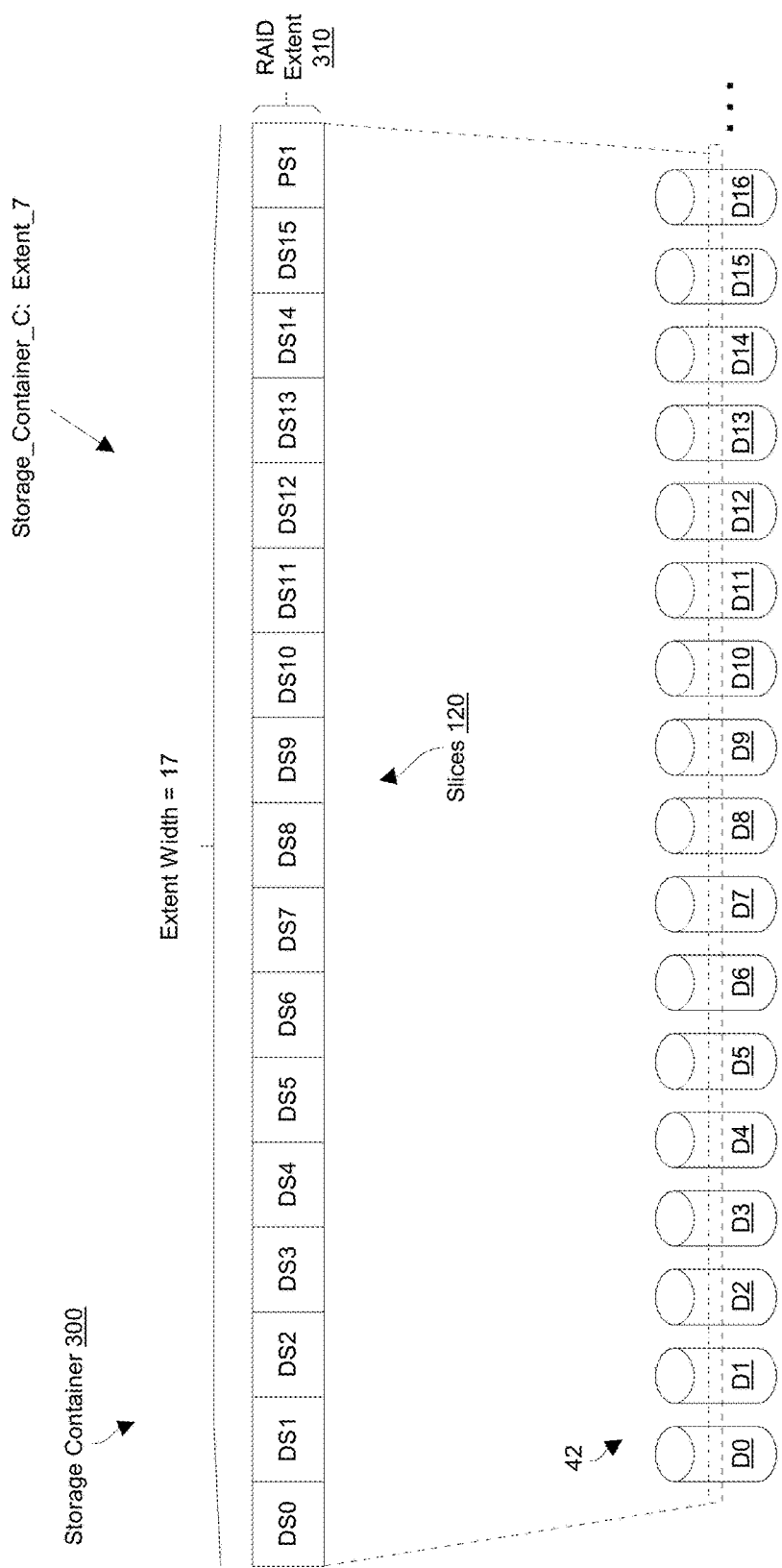
FIG. 5 is a block diagram illustrating particular details of a third example storage container in accordance with certain embodiments.

FIGS. 3 through 5 show examples of storage containers that are capable of being created and utilized by the specialized control circuitry of the data storage equipment 24 in accordance with certain embodiments. FIG. 3 shows a first example storage container 100 formed from several extents having a first width. FIG. 4 shows a second example storage container 200 formed from a couple of extents having a second width. FIG. 5 shows a third example storage container 100 formed from just one extent having a third width.

It will be later explained in further detail and with reference to FIGS. 6 through 8 that the example storage containers 100, 200, 300 may reside on the same group of storage devices 42. Such a situation allows the specialized control circuitry that creates the example storage containers 100, 200, 300 and manages data within the example storage containers 100, 200, 300 to use different RAID protection schemes on the same group of storage devices 42 rather than require different groups of storage devices for different RAID protection schemes.

In accordance with certain embodiments, the example storage containers 100, 200, 300 include storage slices of the same size (e.g., 4 GB). Additionally, the example storage containers 100, 200, 300 are constructed and arranged to hold the same amount of host data 32 (e.g., 64 GB) even though the example storage containers 100, 200, 300 include RAID extents having different widths.

With reference now to FIG. 3, the specialized control circuitry of the data storage equipment 24 forms the first example storage container 100 from four RAID extents 110(1), 110(2), 110(3), 110(4) (collectively, RAID extents 110). Each RAID extent 110 includes five slices 120 where each slice 120 is the same size. Additionally, each RAID extent 110 has a width equal to five (5) since each RAID extent 110 includes exactly one slice from five different storage devices 42.

In accordance with certain embodiments, to form the storage container 100 within the data storage equipment 24 (also see FIG. 1), the control circuitry partitions a group of storage devices 42 into the slices 120 of the same size (also see FIG. 1). The group may contain any number of storage devices 42 but is wide enough to accommodate RAID extents of some predefined maximum width (e.g., 17 storage devices 42 for RAID5 (16+1), 18 storage devices 42 for RAID5 (16+2), and so on).

After the group of storage devices 42 has been partitioned into the slices 120 of the same size, the control circuitry may reserve some slices 120 (e.g., as designated spare space) and then designate the remaining slices 120 for use in RAID extents. Next, the control circuitry combines slices 120 to form the RAID extents that can then be used in storage containers. Formation and/or allocation of the RAID extents may be performed at a variety of different times, e.g., prior to data storage equipment deployment, in response to a human admin command during operation in the field, in real-time in response to the need for a storage container, combinations thereof, etc.

To form the storage container 100, the control circuitry creates and combines four RAID extents 110 together. This process may entail designating which RAID extents 110 belong to the storage container 100 (e.g., "Storage_Container_A: Extent_1, Extent_2, Extent_3, Extent_4" where Storage_Container_A is a container identifier that uniquely identifies the particular storage container 100 within the group of storage devices 42 and Extent_1, Extent_2, Extent_3, and Extent_4 are extent identifiers that uniquely identify particular RAID extents 110 within the group of storage devices 42. It will be explained in further detail with reference to FIG. 6 that the RAID extents 110 can be identified by extent identifiers and can list device/offset pairs (e.g., device_X: offset_Y).

It should be understood that, even though the example storage container 100 includes four slices DS0, DS4, DS8, DS12 from storage device D0, there is no requirement that any of the slices DS0, DS4, DS8, DS12 be adjacent to each other. Rather, the slices DS0, DS4, DS8, DS12 may be in different locations and may be physically and logically separated from each other by one or more other slices 120. Similar flexibility applies to the slices 120 in the other storage devices 42 (i.e., the slices 120 of the different RAID extents 110 that form the contain 100 do not need to be adjacent/contiguous).

It should be further understood that each RAID extent 110 stores data using a particular RAID protection scheme. By way of example only, the type of RAID protection scheme for the RAID extents 110 is RAID5 (4+1). Accordingly, slices DS0, DS1, DS2, and DS3 are four data slices that hold four data segments while slice PS1 is a parity slice that holds one parity segment for these four data segments. Similarly, slices DS4, DS5, DS6, and DS7 are four data slices that hold four data segments while slice PS2 is a parity slice that holds one parity segment for these four data segments, and so on. It should be appreciated that each parity segment is generated based on XOR operations on regular data segments, and enables data segment reconstruction/recovery using XOR operations.

Moreover, as illustrated in FIG. 3, the parity slices P1, P2, P3, P4 may be staggered among the storage devices 42. With the parity slices P1, P2, P3, P4 distributed among the storage devices 42 in such a staggered fashion, there may be less stress than having a dedicated parity storage device 42 and improved balancing of certain operations compared to other RAID protection schemes.

With reference now to FIG. 4, the specialized control circuitry of the data storage equipment 24 forms the second example storage container 200 from two RAID extents 210(1), 210(2) (collectively, RAID extents 210). Each RAID extent 210 includes nine slices 120 where each slice 120 is the same size. Additionally, each RAID extent 210 has a width equal to nine (9) since each RAID extent 210 includes exactly one slice from nine different storage devices 42.

In accordance with certain embodiments and as mentioned earlier in connection with FIG. 3, the control circuitry partitions a group of storage devices 42 into the slices 120 of the same size. The group may contain any number of storage devices 42 but is wide enough to accommodate RAID extents of some predefined maximum width (e.g., 17 storage devices 42 for RAID5 (16+1), 18 storage devices 42 for RAID5 (16+2), and so on).

As mentioned earlier, after the group of storage devices 42 has been partitioned into the slices 120 of the same size, the control circuitry combines slices 120 to form RAID extents which can then be used in storage containers. Such formation and/or allocation of the RAID extents may be performed at a variety of different times, e.g., prior to data storage equipment deployment, in response to a human admin command during operation in the field, in real-time/ on demand, combinations thereof, etc.

To form the storage container 200, the control circuitry creates and combines two RAID extents 210 together. This process may entail designating which RAID extents 210 belong to the storage container 200 (e.g., "Storage_Container_B: Extent_5, Extent_6" where Storage_Container_B is a container identifier that uniquely identifies the particular storage container 100 within the group of storage devices 42 and Extent_5, Extent_6 are extent identifiers that uniquely identify particular RAID extents 210 within the group of storage devices 42.

It should be understood that, even though the example storage container 200 includes two slices DS0, DS8 from storage device D0, there is no requirement that the two slices DS0, DS8 be adjacent to each other. Rather, the slices DS0, DS8 may be in different locations and may be physically and logically separated from each other by one or more other slices 120. Similar flexibility applies to the slices 120 of the RAID extents 210 in the other storage devices 42.

It should be further understood that each RAID extent 210 stores data using a particular RAID protection scheme. By way of example only, the type of RAID protection scheme for the RAID extents 210 is RAID5 (8+1). Accordingly, slices DS0, DS1, DS2, DS3, DS4, DS5, DS6, and DS7 are eight data slices that hold eight data segments while slice PS1 is a parity slice that holds one parity segment for these eight data segments. Similarly, slices DS8, DS9, DS10, DS11, DS12, DS13, DS14, and DS15 are eight data slices that hold eight data segments while slice PS2 is a parity slice that holds one parity segment for these eight data segments, and so on.

Moreover, as illustrated in FIG. 4, the parity slices P1 and P2 may be staggered among the storage devices 42. With the parity slices P1 and P2 distributed among the storage devices 42 there may be less stress than having a dedicated parity storage device 42 and improved balancing of certain operations compared to other RAID protection schemes.

With reference now to FIG. 5, the specialized control circuitry of the data storage equipment 24 forms the third example storage container 300 from one RAID extent 310. The RAID extent 210 includes 17 slices 120 where each slice 120 is the same size. Additionally, the RAID extent 310 has a width equal to 17 since the RAID extent 310 includes exactly one slice from 17 different storage devices 42.

In accordance with certain embodiments and as mentioned earlier in connection with FIG. 3, the control circuitry partitions a group of storage devices 42 into the slices 120 of the same size. The group may contain any number of storage devices 42 but is wide enough to accommodate RAID extents of some predefined maximum width (e.g., 17 storage devices 42 for RAID5 (16+1), 18 storage devices 42 for RAID5 (16+2), and so on).

After the group of storage devices 42 has been partitioned into the slices 120 of the same size, the control circuitry forms RAID extents and storage containers from the RAID extents. To form the example storage container 300, the control circuitry creates the RAID extent 310 and assigns the RAID extent 310 to the storage container 300 (e.g., "Storage_Container_C: Extent_7" where Storage_Container_C is a container identifier that uniquely identifies the particular storage container 300 within the group of storage devices 42 and Extent_7 is an extent identifier that uniquely identifies a particular RAID extent 310 within the group of storage devices 42.

It should be understood that the RAID extent 310 stores data using a particular RAID protection scheme. By way of example only, the type of RAID protection scheme for the RAID extent 310 is RAID5 (16+1). Accordingly, slices DS0, DS1, DS2, DS3, DS4, DS5, DS6, DS7, DS8, DS9, DS10, DS11, DS12, DS13, DS14, and DS15 are 16 data slices that hold 16 data segments while slice PS1 is a parity slice that holds one parity segment for these 16 data segments. Further details will now be provided with reference to FIGS. 6 through 8.

Figure 6:
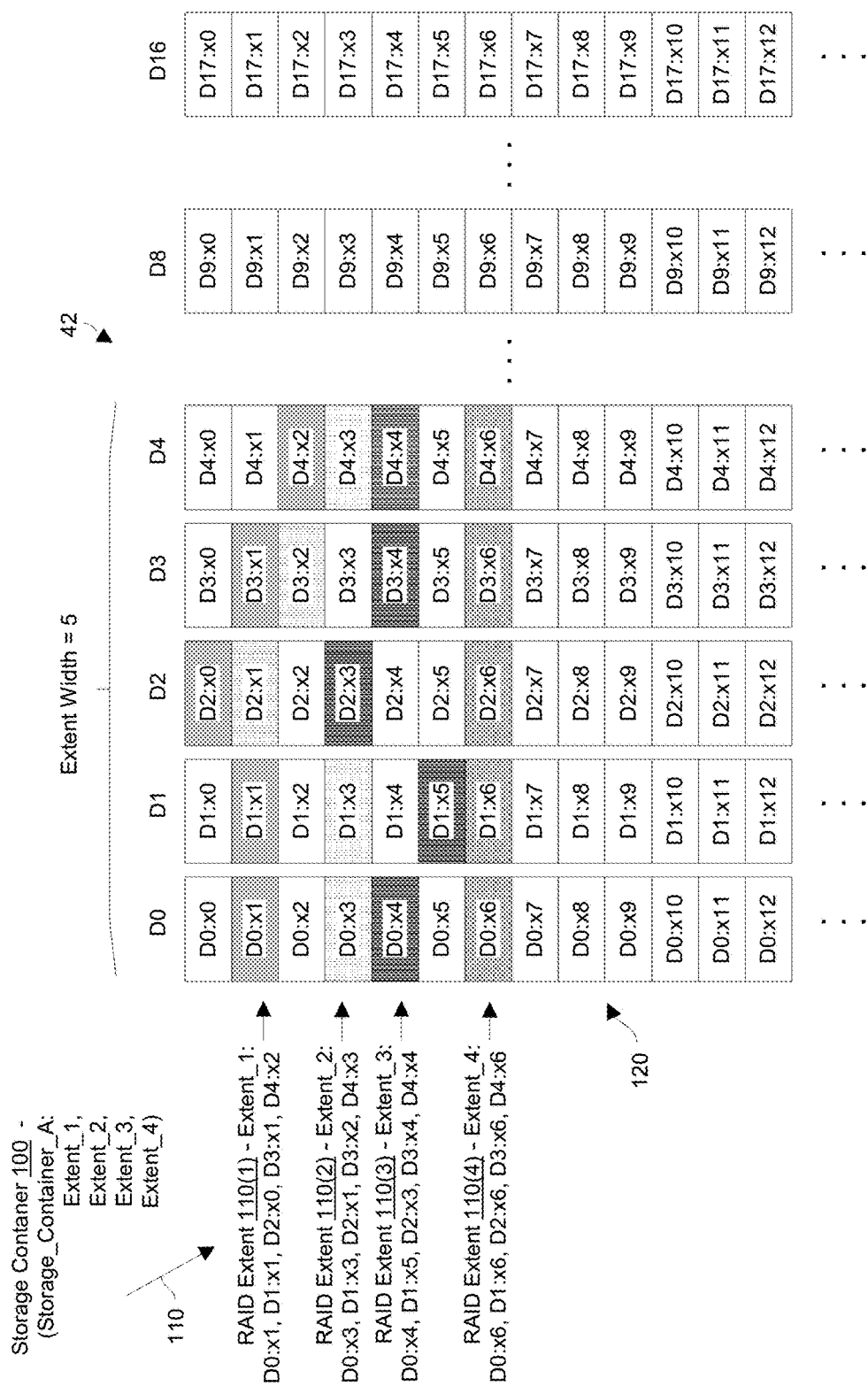
FIG. 6 is a block diagram illustrating further details of the first example storage container in accordance with certain embodiments.
Figure 7:
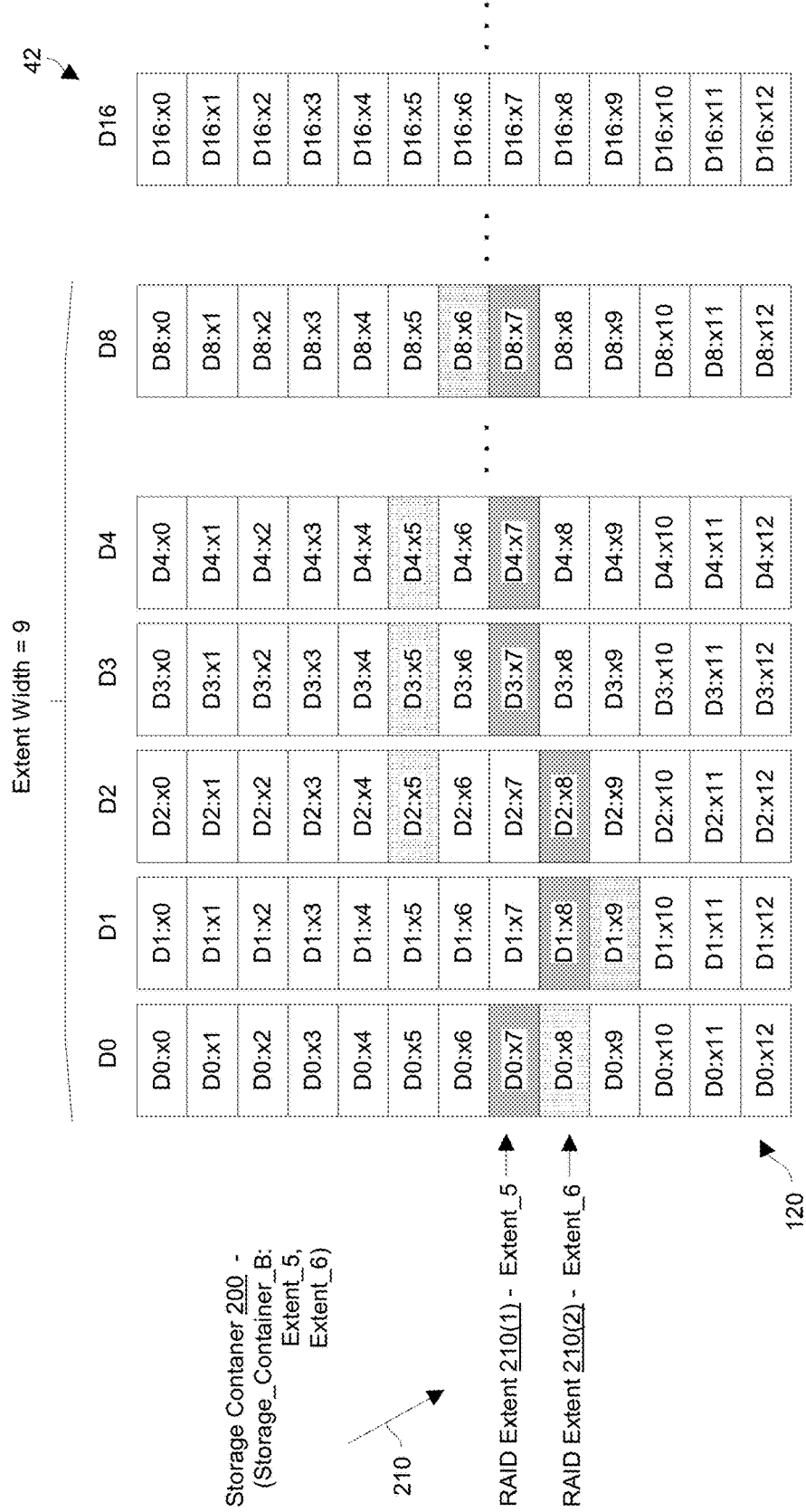
FIG. 7 is a block diagram illustrating further details of the second example storage container in accordance with certain embodiments.
Figure 8:
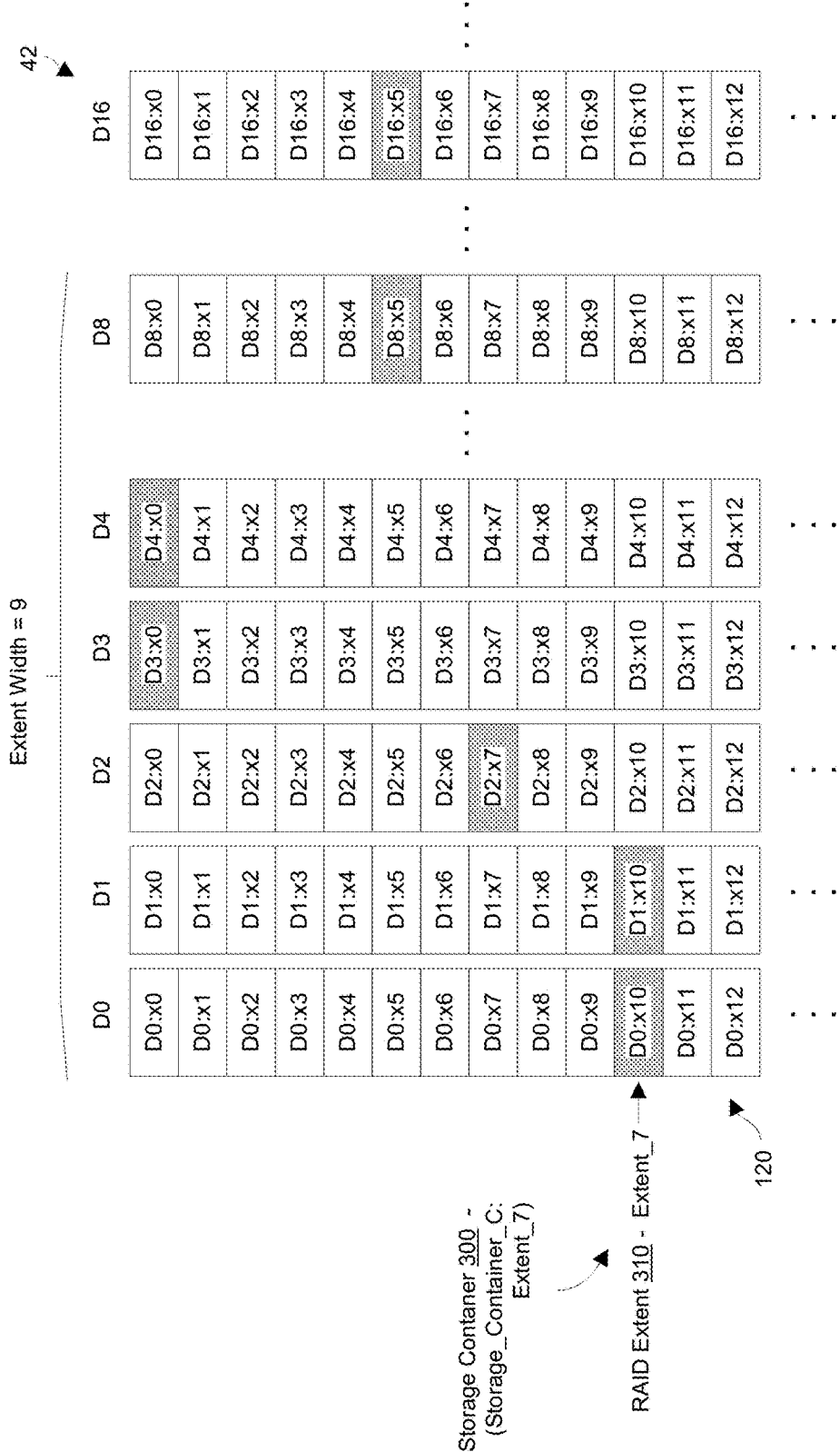
FIG. 8 is a block diagram illustrating further details of the third example storage container in accordance with certain embodiments.

FIGS. 6 through 8 show example slice placements for the RAID extents having different widths that form storage containers within the same group of storage devices 42 in accordance with certain embodiments (also see FIGS. 1 and 3 through 5). Recall that the RAID extents having different widths provide different types of RAID protection (e.g., RAID5 (4+1), RAID5 (8+1), RAID5 (16+1), etc.).

Furthermore, regardless of the RAID extent width, each RAID extent includes slices 120 of the same size (e.g., 4 GB). Each slice 120 is identifiable via a device offset pair, i.e., a storage device identifier that uniquely identifies a particular storage device 42 of the group of storage devices 42 and an offset that uniquely identifies a particular location on that storage device 42. A suitable format for identifying a slice 120 is D#:x# where D# is the storage device identifier and x# is the offset within that storage device.

With reference now to FIG. 6, the storage container 100 includes four RAID extents 110 having a width equal to 5 (i.e., one slice 120 from 5 different storage devices 42, also see FIG. 3). In particular, the storage container 100 may use the following definition: "Storage_Container_A: Extent_1, Extent_2, Extent_3, Extent_4" which uniquely identifies the particular storage container 100 and the four RAID extents 110 that form the particular storage container 100.

Each RAID extent 110 provides a particular type of RAID protection. By way of example, the each RAID extent 110 provides RAID5 (4+1) protection. That is, each RAID extent 110 includes four data slices and one parity slice (also see FIG. 3).

As further shown in FIG. 6, the RAID extent 110(1) may use the following definition: "Extent_1: D0:x1, D1:x1, D2:x0, D3:x1, D4:x2". Similarly, the RAID extent 110(2) may use the following definition: "Extent_2: D0:x3, D1:x3, D2:x1, D3:x2, D4:x3", and so on.

It should be clear that the slices 120 within each RAID extent 110 do no need to have the same offsets. For example, the some slices 120 for the RAID extent 110(1) have x1 as the offset, but other slices have x0 and x2 as offsets.

Additionally, there is no requirement that the slices 120 of the RAID extents 110 be contiguous with each other. Rather, the slices 120 of the different RAID extents 110 may be separated by one or more other slices 120. For example, there are two slices D2:x4, D2:x5 that separate the slice D2:x3 used by the RAID extent 110(3) and the slice D2:x6 used by the RAID extent 110(4). The slices D2:x4, D2:x5 do not belong to the storage container 100.

In some arrangements, the storage container 100 includes 16 data slices and 4 parity slices. In these arrangements, if each slice holds 4 GB of data, the storage container 100 holds 64 GB of regular data and 16 GB of parity data. Accordingly, the ratio of data to parity is 4:1 (i.e., 80% is available for regular data and 20% is for overhead).

With reference now to FIG. 7, the storage container 200 includes two RAID extents 210 having a width equal to 9 (i.e., one slice 120 from nine different storage devices 42, also see FIG. 4). In particular, the storage container 200 may use the following definition: "Storage_Container_B: Extent_5, Extent_6" which uniquely identifies the particular storage container 200 and the two RAID extents 210 that form the particular storage container 200.

Each RAID extent 210 provides a particular type of RAID protection that is different from the RAID protection provided by the RAID extents 110. By way of example, the each RAID extent 210 provides RAID5 (8+1) protection. That is, each RAID extent 210 includes eight data slices and one parity slice (also see FIG. 4).

It should be understood that the RAID extents 210 may use definitions similar to those of the RAID extents 110 (also see FIG. 6). That is, each RAID extent 210 can be uniquely identified by a RAID extent identifier and a list of slice identifiers.

Again, it should be clear that the slices 120 within the RAID extents 210 do no need to have the same offsets. For example, the some slices 120 for the RAID extent 210(1) have x7 as the offset, other slices have x8 as the offset, and so on.

Additionally, there is no requirement that the slices 120 of the RAID extents 210 be contiguous with each other. Rather, slice 120 of the different RAID extents 210 may be separated by one or more other slices 120. Moreover, the RAID extents may crisscross, interleave, etc.

In some arrangements, the storage container 200 includes 16 data slices and 2 parity slices. In these arrangements, if each slice holds 4 GB of data, the storage container 200 holds 64 GB of regular data and 8 GB of parity data. Accordingly, the ratio of data to parity is 8:1 (i.e., 89% is available for regular data and 11% is for overhead).

With reference now to FIG. 8, the storage container 300 includes one RAID extent 310 having a width equal to 17 (i.e., one slice 120 from 17 different storage devices 42, also see FIG. 5). In particular, the storage container 300 may use the following definition: "Storage_Container_C: Extent_7" which uniquely identifies the particular storage container 300 and the RAID extent 310 that forms the storage container 300.

The RAID extent 310 provides a particular type of RAID protection that is different from the RAID protection provided by the other RAID extents 110, 210. By way of example, the RAID extent 310 provides RAID5 (16+1) protection. That is, the RAID extent 310 includes 16 data slices and one parity slice (also see FIG. 5).

It should be understood that the RAID extent 310 may use a definition similar to those of the RAID extents 110, 210. That is, the RAID extent 310 can be uniquely identified by a RAID extent identifier and a list containing at least one slice identifier.

Again, it should be clear that the slices 120 within the RAID extent 310 do no need to have the same offsets. For example, the some slices 120 for the RAID extent 310 have x10 and the offset, other slices have x0 as the offset, and so on.

In some arrangements, the storage container 300 includes 16 data slices and one parity slice. In these arrangements, if each slice holds 4 GB of data, the storage container 300 holds 64 GB of regular data and 4 GB of parity data. Accordingly, the ratio of data to parity is 16:1 (i.e., 94% is available for regular data and 6% is for overhead).

As shown by extent layouts in FIGS. 6 through 8, the same group of storage devices 42 (e.g., D0, D1, D2, . . . , D16) provides slices of the same size (e.g., 4 GB). Furthermore, these slices of the same size are suitable for use in any of the different RAID extents 110, 210, 310 having different widths and that provide different RAID protection.

FIGS. 6 through 8 show example slice placements for the RAID extents 110, 210, 310 having the different widths that form storage containers 100, 200, 300 within the same group of storage devices 42 in accordance with certain embodiments (also see FIGS. 1 and 3 through 5). That is, if the layouts of FIGS. 6 through 8 were overlaid on top of each other, all of the storage containers 100, 200, 300 would fit in the same group of storage devices 42 at the same time, and could be used concurrently to hold data on behalf of one or more host computer 22.

Moreover, the different storage 100, 200, 300 allow for customized RAID protection (e.g., different RAID protection for different applications). To this end and by way of example only, recall that the RAID extents 110, 210, 310 have the different widths and provide different types of RAID protection (e.g., RAID5 (4+1), RAID5 (8+1), RAID5 (16+1), etc.).

Additionally, regardless of the particular widths for the RAID extents, each RAID extent includes slices 120 of the same size (e.g., 4 GB). Accordingly, during operation of the data storage equipment 24 (FIG. 1), a particular slice 120 may form part of a first RAID extent having a first width, but then be released back into a pool of free slices and later reused to form part of a second RAID extent having a second width that is different from the first width. Such flexibility provides increase storage efficiency within a mapped RAID system. Additionally, such flexibility alleviates the need for storing only containers formed from RAID extents having a first width in a first group of storage devices and other containers formed from other RAID extents having a second width in a second group of storage devices, and so on. Rather, for the data storage equipment 24 disclosed herein, the same group of storage devices 42 can have storage containers 100, 200, 300 formed from RAID extents 110, 210, 310 having different widths.

It should be further understood that not only is data stored within the storage containers 100, 200, 300, data is also protected within the storage containers 100, 200, 300. For example, if a particular storage device 42 of the group of storage devices 42 were to fail, the data that resided on that storage device 42 can be reconstructed based on the data segments in the remaining slices 120 of each RAID extent. Further details will now be provided with reference to FIG. 9.

Figure 9:
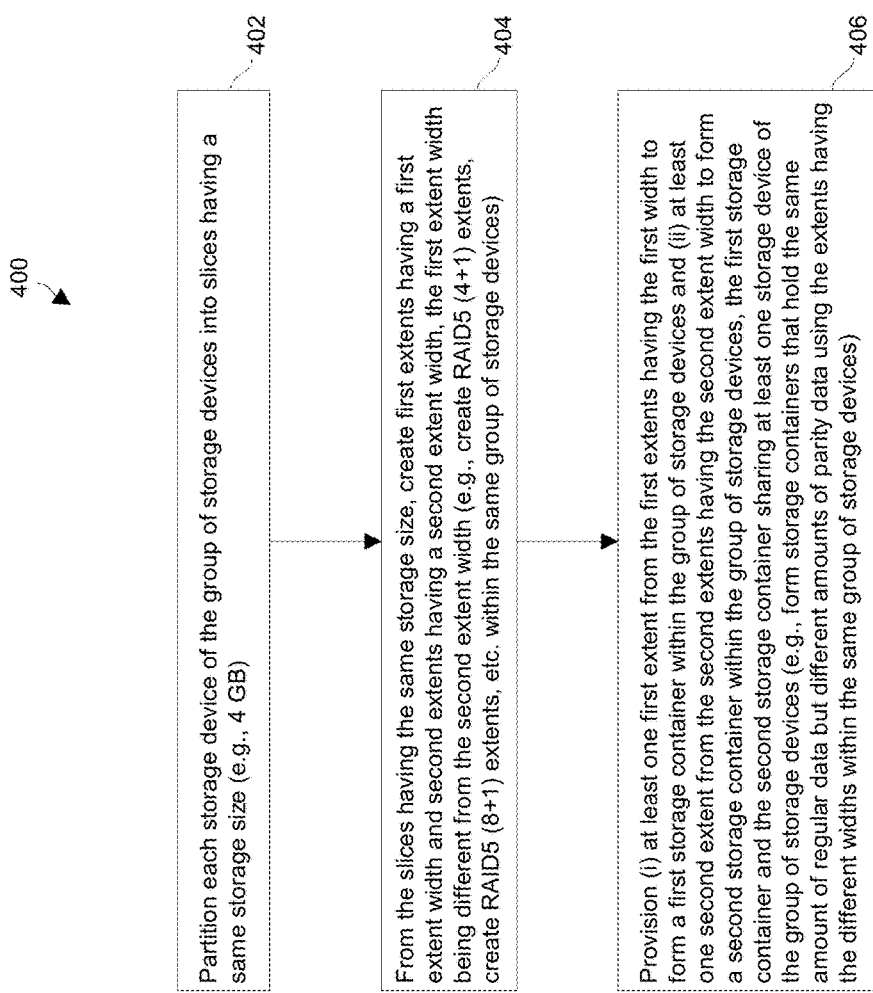
FIG. 9 is a flowchart of a procedure which is performed by the data storage environment of FIG. 1 in accordance with certain embodiments.

FIG. 9 is a flowchart of a procedure 400 for forming storage containers within a group of storage devices 42 of the data storage equipment 24 in accordance with certain embodiments. The procedure 400 is performed by specialized control circuitry (also see the processing circuitry 66 and specialized instructions and data 74 in FIG. 2).

At 402, the specialized control circuitry partitions each storage device of the group of storage devices into slices having a same storage size. By way of example, each storage slice may be configured to hold 4 GB of data. Other amounts of data are suitable for use as well such as 500 MB, 1 GB, 2 GB, 8 GB, 16 GB, etc.

At 404, the specialized control circuitry creates, from the slices having the same storage size, first extents having a first extent width and second extents having a second extent width. The first extent width is different from the second extent width.

At 406, the specialized control circuitry provisions (i) at least one first extent from the first extents having the first extent width to form a first storage container within the group of storage devices and (ii) at least one second extent from the second extents having the second extent width to form a second storage container within the group of storage devices. The first storage container and the second storage container share at least one storage device of the group of storage devices.

Moreover, although the storage containers may provide the same capacity for regular data (e.g., 64 GB), the storage containers may be configured to hold different amounts of parity data. For example, some storage containers may dedicate 20% of storage to parity, other storage containers may dedicate 11% of storage to parity, and so on.

As described above, improved techniques are directed to forming storage containers 100, 200, 300 from extents 110, 210, 310 having different widths where the extents 110, 210, 310 share the same group of storage devices 42. For example, on the same group of storage devices 42, a first storage container 100 can be formed from four RAID5 (4+1) extents and a second storage container 200 can be formed from two RAID5 (8+1) extents where each RAID extent includes slices 120 having the same size (e.g., 4 GB). Moreover, due to how the various RAID extents are now specified (e.g., via listings of device identifier:slice offset pairs), there is no requirement that, when a storage container 100, 200, 300 includes RAID extents on the same storage device 42, slices 120 belonging to the RAID extents need to be adjacent to each other on the storage device 42. Such techniques not only provide improved storage slice allocation flexibility but also enable greater storage efficiency.

One should appreciate that the above-described techniques do not merely collect and store data. Rather, in accordance with certain embodiments, the disclosed techniques involve improvements to the technology of data storage within a mapped RAID system. In particular, with the techniques disclosed herein, there is greater flexibility in slice utilization leading to increased storage efficiency. Moreover, such techniques do not require placing containers of one width on one group of storage devices, and other containers of another width on another group of storage devices, but enable storage containers of different widths to reside on the same group of storage devices. Other advantages are provided as well, e.g., improved ability to identify extents and containers, the ability to support different data to parity ratios in a single location, etc.

While various embodiments of the present disclosure have been particularly shown and described, it will be understood by those skilled in the art that various changes in form and details may be made therein without departing from the spirit and scope of the present disclosure as defined by the appended claims.

One should further appreciate that existing approaches that would maintain the capacity of a RAID storage unit would either need to support multiple disk extent sizes (which could result in unusable capacity) or would not be able to use disks that were consumed for a RAID storage unit of a different width.

However, in accordance with some of the improvements disclosed herein, mapped RAID consumes storage devices by partitioning them into extents. Each RAID storage unit will consume an extent from a different drive. For instance a parity 4+1 RAID storage unit would consume 5 extents from different drives. Prior to this method to keep the capacity of the RAID storage unit the same when using a RAID of a different width (for instance parity 8+1) either a different set of disks would be required or the disk extent size would need to be smaller. This solution uses multiple disk extents for each position of the RAID storage unit to allow different RAID storage units of different width to maintain the same capacity. For instance a parity RAID 4+1 storage unit would consume (4) disk extents per position. A parity RAID 8+1 would consume (2) disk extents per position. A parity RAID 16+1 would consume (1) disk extent per position.

In accordance with certain embodiments, improved techniques consume the capacity of disk drives for RAID with different widths. Previously Mapped RAID groups that contain a different number of data elements could not share the same set of drives. However, the improved techniques allow RAID groups with a different number of data elements be able to use the same set of drives.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, it should be understood that various components of the data storage environment 20 such as the host computer 22, the other equipment 26, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the size of each storage container 100, 200, 300 was described above as being 64 GB by way of example only. In other embodiments, the capacity for each storage container 100, 200, 300 is different (e.g., the capacity of each storage container is 16 GB, 32 GB, 64 GB, 128 GB, and so on).

Furthermore, the particular RAID protection schemes that were described were provided by way of example only. Other RAID protection schemes are suitable for use in place of or in addition to the particular RAID protection schemes (e.g., RAID5 (12+1), RAID6 (4+2), RAID6 (6+2), RAID6 (8+2), . . . ).

Moreover, there is no restriction on the number of each storage container that can be placed in the group of storage devices 42. That is, at any particular point in time, the group of storage devices 42 may have zero or more storage containers 100 having a first width, zero or more storage containers 200 having a second width, zero or more storage containers 300 having a third width, and so on. Also, other widths are suitable for use in other RAID extents as well (e.g., 3, 4, 6, 7, 8, and so on). Such modifications and enhancements are intended to belong to various embodiments of the disclosure.

What is claimed is:

1. In data storage equipment, a method of forming storage containers within a group of storage devices, the method comprising:

partitioning each storage device of the group of storage devices into slices having a same storage size;

from the slices having the same storage size, creating first extents having a first extent width and second extents having a second extent width, the first extent width being different from the second extent width; and provisioning (i) at least one first extent from the first extents having the first extent width to form a first storage container within the group of storage devices and (ii) at least one second extent from the second extents having the second extent width to form a second storage container within the group of storage devices, the first storage container and the second storage container sharing at least one storage device of the group of storage devices;

wherein creating the first extents having the first extent width and the second extents having the second extent width includes:

generating, as the first extents having the first extent width, first RAID (redundant array of independent devices) extents, each first RAID extent containing multiple data slices and at least one parity slice to provide a first ratio of data to parity, and generating, as the second extents having the second extent width, second RAID extents, each second RAID extent containing multiple data slices and at least one parity slice to provide a second ratio of data to parity, the first ratio of data to parity being different from the second ratio of data to parity.

2. A method as in claim 1 wherein each first extent having the first extent width includes exactly a first number of slices;
wherein each second extent having the second extent width includes exactly a second number of slices, the first number of slices being different from the second number of slices; and
wherein provisioning includes:
allocating a first number of first extents to form the first storage container and a second number of second extents to form the second storage container, the first number of first extents being different from the second number of second extents.

3. A method as in claim 2 wherein allocating the first number of first extents to form the first storage container and the second number of second extents to form the second storage container includes:
provisioning each of the first storage container and the second storage container with a same total number of data slices so as to configure each of the first storage container and the second storage container to hold a same amount of data.

4. A method as in claim 3 wherein partitioning each storage device of the group of storage devices into slices having the same storage size includes:
dividing storage space provided by each storage device of the group of storage devices into 4-GB (gigabyte) portions to form the slices having the same storage size.

5. A method as in claim 4 wherein provisioning each of the first storage container and the second storage container with the same total number of data slices includes:
provisioning the first storage container with a first 4-GB portion from a particular storage device and the second storage container with a second 4-GB portion from the particular storage device.

6. A method as in claim 4 wherein provisioning each of the first storage container and the second storage container with the same total number of data slices includes:
provisioning each of the first storage container and the second storage container with 16 4-GB portions for holding data so as to configure each of the first storage container and the second storage container to hold 64 GB of data.

7. A method as in claim 6 wherein each first RAID extent includes exactly four data slices and exactly one parity slice;
wherein each second RAID extent includes exactly eight data slices and exactly one parity slice; and
wherein provisioning each of the first storage container and the second storage container with 16 4-GB portions includes:
providing the first storage container with exactly four first RAID extents, and
providing the second storage container with exactly two second RAID extents.

8. A method as in claim 6 wherein each first RAID extent includes exactly eight data slices and exactly one parity slice;
wherein each second RAID extent includes exactly 16 data slices and exactly one parity slice; and
wherein provisioning each of the first storage container and the second storage container with 16 4-GB portions includes:
providing the first storage container with exactly two first RAID extents, and
providing the second storage container with exactly one second RAID extent.

9. A method as in claim 6 wherein each first RAID extent includes exactly four data slices and exactly one parity slice;
wherein each second RAID extent includes exactly 16 data slices and exactly one parity slice; and
wherein provisioning each of the first storage container and the second storage container with 16 4-GB portions includes:
providing the first storage container with exactly four first RAID extents, and
providing the second storage container with exactly one second RAID extent.

10. A method as in claim 1, further comprising:
in response to a first storage request to store first host data on behalf of a set of host computers, (i) generating first parity from a portion of the first host data and (ii) storing the portion of the first host data and the first parity in a first RAID extent, and
in response to a second storage request to store second host data on behalf of the set of host computers, (i) generating second parity from a portion of the second host data and (ii) storing the portion of the second host data and the second parity in a second RAID extent.

11. A method as in claim 10 wherein the first RAID extent and the second RAID extent share a particular storage device of the group of storage devices; and
wherein the method further comprises:
sustaining a failure of the particular storage device that loses a part of the first RAID extent and a part of the second RAID extent, and
performing a RAID recovery operation that reconstructs the part of the first RAID extent from remaining parts of the first RAID extent and reconstructs the part of the second RAID extent from remaining parts of the second RAID extent.

12. A method as in claim 1 wherein generating the first RAID extents includes:
preventing each first RAID extent from having more than one slice from the same storage device, and
wherein generating the second RAID extents includes:
preventing each second RAID extent from having more than one slice from the same storage device.

13. A method as in claim 12 wherein the first RAID extents are RAID5 (4+1) extents, each RAID5 (4+1) extent having exactly four data slices and exactly one parity slice;
wherein the second RAID extents are RAID5 (8+1) extents, each RAID5 (8+1) extent having exactly eight data slices and exactly one parity slice; and
wherein the method further includes:
generating third RAID extents, each third RAID extent containing exactly 16 data slices and exactly one parity slice, and
allocating exactly one third RAID extent from the third RAID extents to form a third storage container that shares at least one storage device of the group of storage devices with the first storage container and the second storage container.

14. A method as in claim 1 wherein multiple first extents having the first extent width are created from a subgroup of storage devices of the group of storage devices;
wherein provisioning includes:
combining only first extents created from the subgroup of storage devices to form the first storage container; and wherein combining only the first extents created from the subgroup of storage devices to form the first storage container includes:
selecting a particular first extent and another first extent for use as at least part of the first storage container, the particular first extent having a first slice on a particular storage device of the subgroup of storage devices and the other first extent having a second slice on the particular storage device of the subgroup of storage devices, the first slice on the particular storage device and the second slice on the particular storage device being separated from each other by at least one slice on the particular storage device that does not belong to the first storage container.

15. In data storage equipment, a method of forming storage containers within a group of storage devices, the method comprising:
partitioning each storage device of the group of storage devices into slices having a same storage size;
from the slices having the same storage size, creating first extents having a first extent width and second extents having a second extent width, the first extent width being different from the second extent width; and
provisioning (i) at least one first extent from the first extents having the first extent width to form a first storage container within the group of storage devices and (ii) at least one second extent from the second extents having the second extent width to form a second storage container within the group of storage devices, the first storage container and the second storage container sharing at least one storage device of the group of storage devices;
wherein multiple first extents having the first extent width are created from a subgroup of storage devices of the group of storage devices;
wherein provisioning includes:
combining only first extents created from the subgroup of storage devices to form the first storage container; and
wherein combining only the first extents created from the subgroup of storage devices to form the first storage container includes:
selecting a particular first extent and another first extent for use as at least part of the first storage container, the particular first extent having a first slice on a particular storage device of the subgroup of storage devices and the other first extent having a second slice on the particular storage device of the subgroup of storage devices, the first slice on the particular storage device and the second slice on the particular storage device being separated from each other by at least one slice on the particular storage device that does not belong to the first storage container.

16. A method as in claim 15 wherein the particular first extent has a first slice on another storage device of the subgroup of storage devices and the other first extent has a second slice on the other storage device of the subgroup of storage devices, the first slice on the other storage device and the second slice on the other storage device being adjacent to each other on the other storage device.

17. Data storage equipment, comprising:
a storage interface constructed and arranged to communicate with a group of storage devices;
memory; and
control circuitry coupled with the storage interface and the memory, the memory storing instructions which, when carried out by the control circuitry, cause the control circuitry to:
partition each storage device of the group of storage devices into slices having a same storage size,
from the slices having the same storage size, create first extents having a first extent width and second extents having a second extent width, the first extent width being different from the second extent width, and
provision (i) at least one first extent from the first extents having the first extent width to form a first storage container within the group of storage devices and (ii) at least one second extent from the second extents having the second extent width to form a second storage container within the group of storage devices, the first storage container and the second storage container sharing at least one storage device of the group of storage devices;
the data storage equipment being constructed and arranged to store host data within the first storage container and the second storage container on behalf of a set of host computers;
wherein the control circuitry, when creating the first extents having the first extent width and the second extents having the second extent width, is constructed and arranged to:
generate, as the first extents having the first extent width, first RAID (redundant array of independent devices) extents, each first RAID extent containing multiple data slices and at least one parity slice to provide a first ratio of data to parity, and
generate, as the second extents having the second extent width, second RAID extents, each second RAID extent containing multiple data slices and at least one parity slice to provide a second ratio of data to parity, the first ratio of data to parity being different from the second ratio of data to parity.

18. Data storage equipment as in claim 17 wherein multiple first extents having the first extent width are created from a subgroup of storage devices of the group of storage devices;
wherein the control circuitry, when provisioning, is constructed and arranged to:
combine only first extents created from the subgroup of storage devices to form the first storage container; and
wherein the control circuitry, when combining only the first extents created from the subgroup of storage devices to form the first storage container, is constructed and arranged to:
select a particular first extent and another first extent for use as at least part of the first storage container, the particular first extent having a first slice on a particular storage device of the subgroup of storage devices and the other first extent having a second slice on the particular storage device of the subgroup of storage devices, the first slice on the particular storage device and the second slice on the particular storage device being separated from each other by at least one slice on the particular storage device that does not belong to the first storage container.

19. A computer program product having a non-transitory computer readable medium which stores a set of instructions to form storage containers within the group of storage devices; the set of instructions, when carried out by computerized circuitry, causing the computerized circuitry to perform a method of:
partitioning each storage device of the group of storage devices into slices having a same storage size;

from the slices having the same storage size, creating first extents having a first extent width and second extents having a second extent width, the first extent width being different from the second extent width; and provisioning (i) at least one first extent from the first extents having the first extent width to form a first storage container within the group of storage devices and (ii) at least one second extent from the second extents having the second extent width to form a second storage container within the group of storage devices, the first storage container including a slice on a particular storage device of the group of storage devices and the second storage container including another slice on the particular storage device of the group of storage devices;

wherein creating the first extents having the first extent width and the second extents having the second extent width includes:

generating, as the first extents having the first extent width, first RAID (redundant array of independent devices) extents, each first RAID extent containing multiple data slices and at least one parity slice to provide a first ratio of data to parity, and generating, as the second extents having the second extent width, second RAID extents, each second RAID extent containing multiple data slices and at least one parity slice to provide a second ratio of data to parity, the first ratio of data to parity being different from the second ratio of data to parity.

20. A computer program product as in claim 19 wherein multiple first extents having the first extent width are created from a subgroup of storage devices of the group of storage devices;

wherein provisioning includes:

combining only first extents created from the subgroup of storage devices to form the first storage container; and wherein combining only the first extents created from the subgroup of storage devices to form the first storage container includes:

selecting a particular first extent and another first extent for use as at least part of the first storage container, the particular first extent having a first slice on a particular storage device of the subgroup of storage devices and the other first extent having a second slice on the particular storage device of the subgroup of storage devices, the first slice on the particular storage device and the second slice on the particular storage device being separated from each other by at least one slice on the particular storage device that does not belong to the first storage container.

\* \* \* \* \*